(12) United States Patent
Allen

(10) Patent No.: US 7,687,004 B2
(45) Date of Patent: Mar. 30, 2010

(54) PROCESS OF MAKING A CLOSURE ADAPTED TO BE USED WITH A CONTAINER

(75) Inventor: David O. Allen, Hillsboro, OH (US)

(73) Assignee: Allen Tool Company, Inc., New Vienna, OH (US)

( * ) Notice: Subject to any disclaimer, the term of this patent is extended or adjusted under 35 U.S.C. 154(b) by 231 days.

(21) Appl. No.: 11/803,867

(22) Filed: May 16, 2007

(65) Prior Publication Data
US 2008/0284064 A1  Nov. 20, 2008

(51) Int. Cl.
*B29B 7/00* (2006.01)
*B29C 45/00* (2006.01)
*B28B 7/20* (2006.01)
*B29D 1/00* (2006.01)
*B27N 3/18* (2006.01)
*B28B 3/00* (2006.01)
*B28B 3/02* (2006.01)
*B29C 41/46* (2006.01)
*B29C 43/02* (2006.01)
*B29C 43/32* (2006.01)
*B29C 51/00* (2006.01)
*B29C 59/02* (2006.01)

(52) U.S. Cl. ............... 264/328.11; 425/577; 264/328.1; 264/328.12; 264/318; 264/319; 264/320

(58) Field of Classification Search ............. 264/328.1, 264/319, 318, 320, 328.12, 328.11; 425/577
See application file for complete search history.

(56) References Cited

U.S. PATENT DOCUMENTS

| | | | |
|---|---|---|---|
| 3,642,161 A | 2/1972 | Stroud | |
| 3,688,942 A | 9/1972 | Mitchell et al. | |
| 3,703,975 A | 11/1972 | Wittemer | |
| 3,885,712 A | 5/1975 | Libit | |
| 4,119,239 A | 10/1978 | Anderson | |
| 4,387,828 A | 6/1983 | Yates, Jr. | |
| 4,467,938 A | 8/1984 | Allen | |
| 4,480,762 A * | 11/1984 | Thomas | 215/273 |
| 4,526,289 A | 7/1985 | Schiemann | |
| 4,579,257 A | 4/1986 | Brändlein | |
| 4,676,388 A | 6/1987 | Kuboshima | |
| D291,971 S | 9/1987 | Smith | |
| 4,697,719 A | 10/1987 | Allen | |
| 4,752,014 A | 6/1988 | House et al. | |
| 4,770,309 A * | 9/1988 | Thompson | 215/344 |
| 4,806,301 A * | 2/1989 | Conti | 264/334 |
| 4,949,865 A | 8/1990 | Turner | |
| D311,140 S | 10/1990 | Nelson | |
| 5,037,290 A * | 8/1991 | Curliss et al. | 425/556 |
| D320,560 S | 10/1991 | Allen | |
| 5,062,552 A | 11/1991 | Heubel | |
| 5,310,981 A | 5/1994 | Sarnoff et al. | |
| 5,375,730 A | 12/1994 | Bahr et al. | |
| 5,449,077 A | 9/1995 | Seidler | |
| 5,720,408 A | 2/1998 | Schmid et al. | |
| 5,769,258 A | 6/1998 | Harrison et al. | |
| 5,833,912 A * | 11/1998 | Schweigert et al. | 264/318 |
| 5,865,330 A | 2/1999 | Buono | |
| 5,881,907 A | 3/1999 | Schutz | |
| 5,908,125 A | 6/1999 | Opresco | |
| 6,431,385 B1 | 8/2002 | Palmer | |
| 6,439,409 B1 | 8/2002 | Dressel et al. | |
| 6,575,323 B1 | 6/2003 | Martin et al. | |
| 6,612,450 B1 * | 9/2003 | Buono | 215/228 |
| 6,682,686 B1 * | 1/2004 | Iwasaki et al. | 264/328.12 |
| D527,633 S | 9/2006 | Stull et al. | |
| 2003/0085227 A1 | 5/2003 | Azzarello | |
| 2005/0145627 A1 | 7/2005 | Stull et al. | |

* cited by examiner

*Primary Examiner*—Khanh Nguyen
*Assistant Examiner*—Matthew Hoover
(74) *Attorney, Agent, or Firm*—Maginot, Moore & Beck

(57) ABSTRACT

A process is disclosed for making a closure having (i) a top portion, and (ii) a latch member that includes an actuator portion and a follower portion, the follower portion including a blocking structure. The process includes providing a mold assembly that defines a space therein which corresponds to the closure, the mold assembly including (i) a first mold portion that defines a first subspace which corresponds to the actuator portion, and (ii) a second mold portion that defines a second subspace which corresponds to the blocking structure. The process further includes advancing a material into the space so as to form the closure. The process also includes moving the second mold portion in relation to the first mold portion after the advancing step so as to remove the actuator portion from the first subspace. In addition, the process includes urging an internal wall of the first mold portion into contact with the actuator portion in response to movement of the second mold portion in relation to the first mold portion so as to cause the actuator portion to move in relation to the top portion. Additionally, the process includes moving the follower portion in relation to the second mold portion in response the urging step so as to cause the blocking structure to move away from of the second subspace.

24 Claims, 12 Drawing Sheets

PROCESS OF MAKING A CLOSURE ADAPTED TO BE USED WITH A CONTAINER

CROSS-REFERENCE TO RELATED APPLICATIONS

Cross reference is made to copending U.S. patent application Ser. No. 11/803,771, entitled "Container and Closure Assembly" by David O. Allen, which is assigned to the same assignee as the present invention, and which is filed concurrently herewith. The disclosure of the above-identified patent application is hereby totally incorporated by reference in its entirety.

FIELD OF THE INVENTION

The present disclosure generally relates to a process for manufacturing a closure that is adapted to be removably attached to a container.

BACKGROUND OF RELATED ART

Container assemblies may have a removable closure that can be separated from the container without a separate tool. The removal of the closure may expose a metal lid or liner that seals the contents of the container, for example, a food product. The container assemblies may be made of materials to permit them to be reheated in a microwave oven. The metal lid or liner may include a pull tab to facilitate its removal. After removal of the metal lid or liner, the closure may then be reattached to the container for a heating operation within a microwave oven.

Closures that heretofore have been designed may include an inner groove into which a lip of a container is fitted. The removal of the closure from an associated container may be relatively difficult since the closure may need to be distorted and/or expanded and forced over the lip of the container. Further, the manner of removal of the closure from the container may not be intuitive to an infrequent user. Moreover, such closures may be difficult to manufacture.

Separate moveable locking portions have been incorporated into closure designs to facilitate removal of the closure from an associated container. The inclusion of these locking portions into the closure design creates challenges for the manufacturer of the closure. In particular, the various features of the moveable locking portions are difficult to remove from various cavities of the molding machine during manufacture of such closures. This difficultly slows down production of the closures.

What is needed therefore is an improved process of manufacturing a closure that is adapted to be used with a container. What is further needed is a process of manufacturing a closure that is adapted to be used with a container which is faster in comparison to other manufacturing processes. What is additionally needed is a process of manufacturing a closure that includes a number of locking portions and which is faster in comparison to other manufacturing processes.

SUMMARY

According to one embodiment of the present disclosure, a process of making a closure having a top portion, a latch member that includes an actuator portion, and a follower portion is provided. The follower portion includes a blocking structure. A hinge connects the latch member to the top portion. The process includes the step of providing a mold assembly that defines a space therein corresponding to the closure. The mold assembly includes a first mold portion that defines a first subspace corresponding to the actuator portion and a second mold portion that defines a second subspace corresponding to the blocking structure. The process further includes the steps of advancing a material into the space so as to form the closure and moving the actuator portion out of the first subspace after the advancing step. The process further includes the steps of pivoting the actuator portion in relation to the top portion in response to the step of moving the actuator portion and moving the blocking structure away from the second subspace in response to the pivoting step.

According to another embodiment of the present disclosure, a process of making a closure having a top portion and a latch member is provided. The latch member includes an actuator portion and a follower portion. The follower portion includes a blocking structure. The process includes the step of providing a mold assembly that defines a space therein which corresponds to the closure. The mold assembly includes a first mold portion that defines a first subspace which corresponds to the actuator portion and a second mold portion that defines a second subspace which corresponds to the blocking structure. The process includes the steps of advancing a material into the space so as to form the closure and moving the second mold portion in relation to the first mold portion after the providing step, so as to remove the actuator portion from the first subspace. The process further includes the step of urging an internal wall of the first mold portion into contact with the actuator portion in response to movement of the second mold portion in relation to the first mold portion, so as to cause the actuator portion to move in relation to the top portion. The process also includes the step of moving the follower portion in relation to the second mold portion in response the urging step, so as to cause the blocking structure to move away from of the second subspace.

BRIEF DESCRIPTION OF THE DRAWINGS

Features of the present invention will become apparent to those skilled in the art from the following description with reference to the drawings, in which.

DETAILED DESCRIPTION

Figure 1:
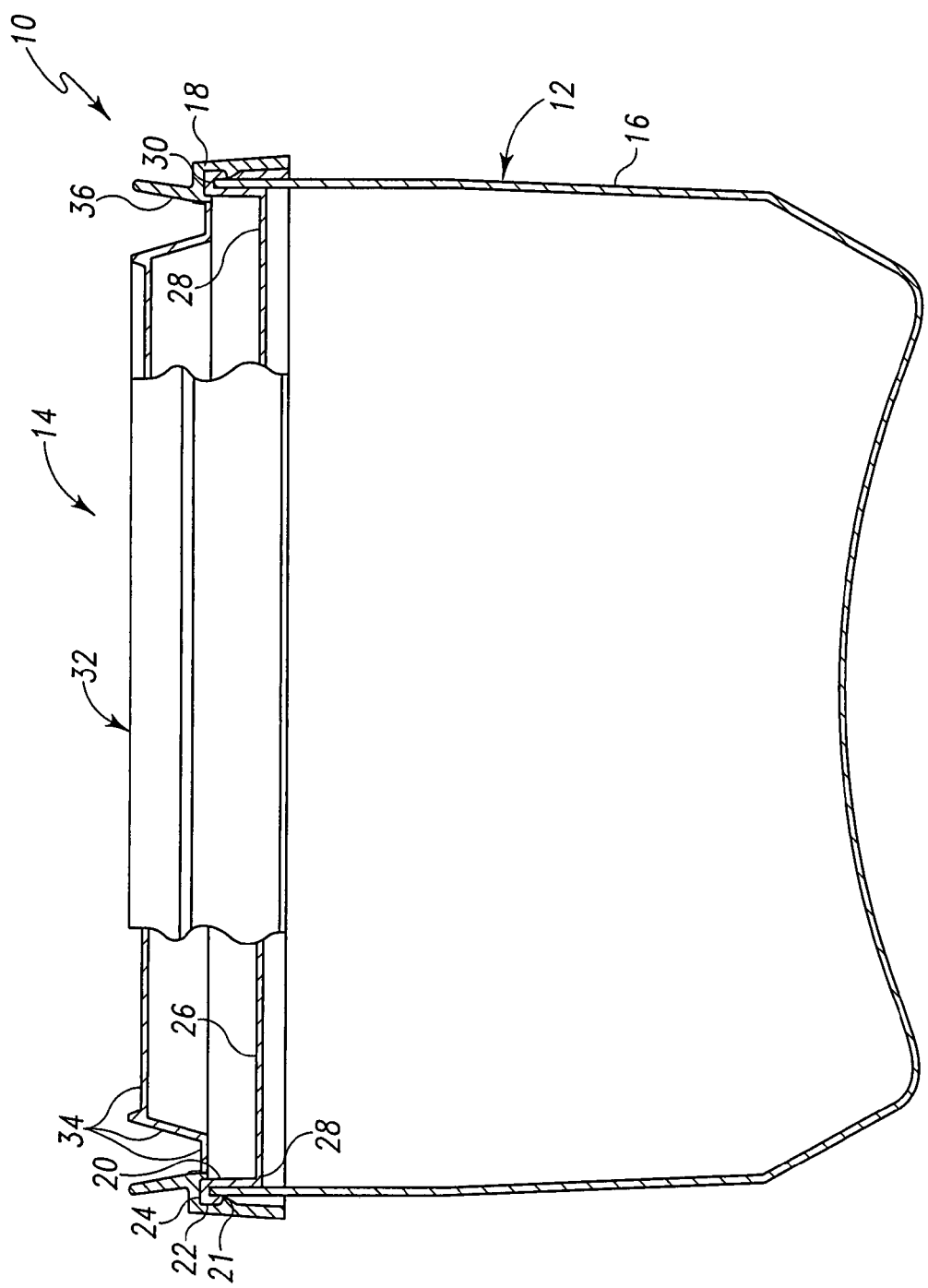
FIG. 1 is a side elevational view, partially in cross section, of a container and closure assembly according to one embodiment of the present disclosure.

According to the present disclosure and referring now to FIG. 1, a container and closure assembly 10 is shown. The container and closure assembly 10 includes a container 12 which defines an opening 14. The container 12 includes a body 16 and a lip 18 extending from the body. The lip 18 is secured to an upper end 30 of the body 16. The lip 18 is positioned completely around the opening 14. The lip 18 may be integrally formed with the body 16 such as by a molding process so that both the lip and the body are collectively a single piece molded polymeric component. Alternatively, the lip 18 may a separate component from the body 16, such that the lip is a metal component that is coupled to a polymeric body as is conventional in the art of containers. In any event, the body 16 and the lip 18 are made from materials that are conventionally used for storage and after-purchase heating of food products such as soups (e.g. tomato soup) and dinners (e.g. ravioli and the like).

Figure 1A:
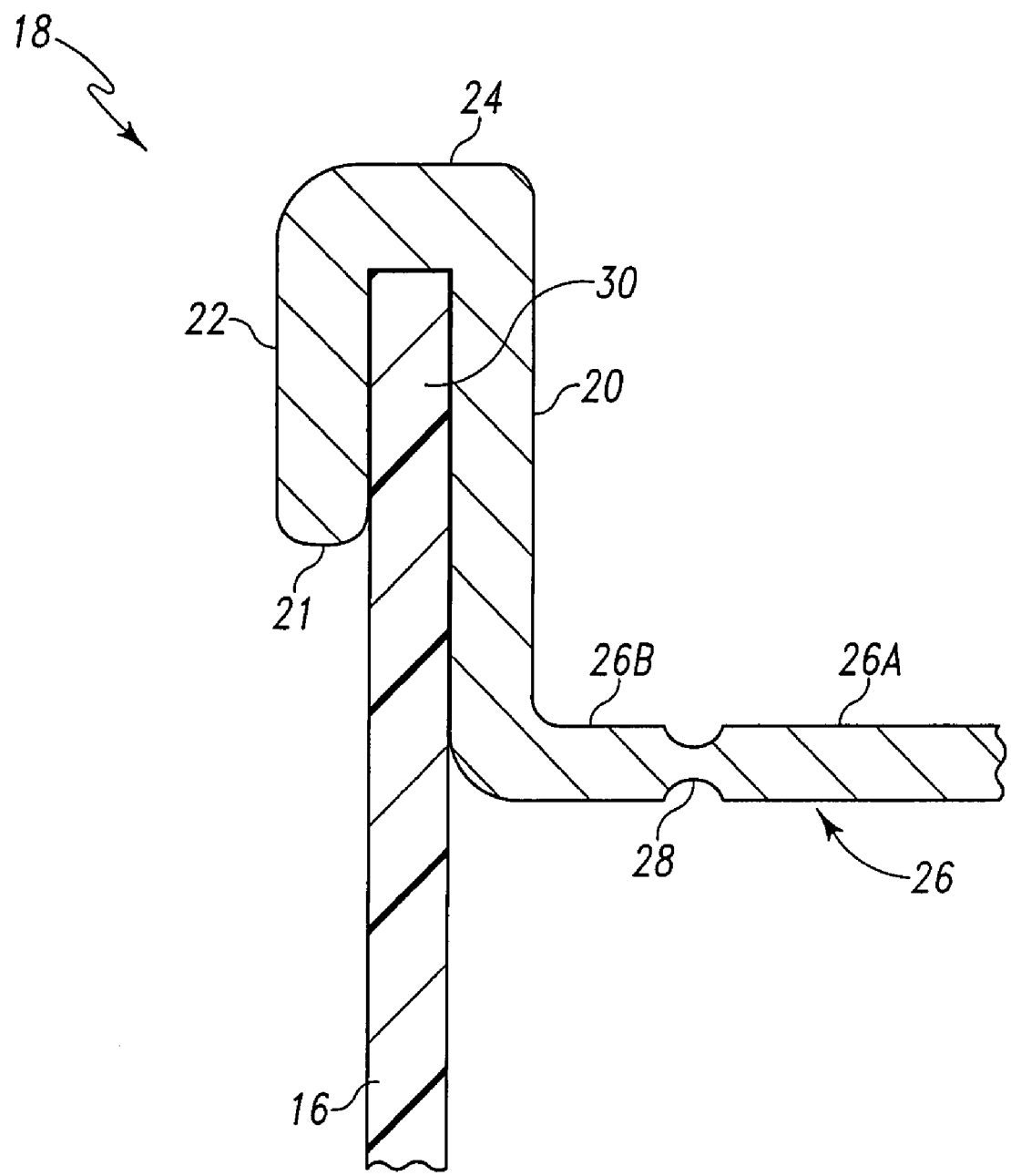
FIG. 1A is an enlarged, fragmentary, cross sectional view of the container of FIG. 1 showing the lip.

As shown in FIGS. 1 and 1A, the lip 18 defines an inner surface 20 and an outer surface 22. The lip 18 further defines a top surface 24 positioned between the inner surface 20 and the outer surface 22. The lip 18 further defines a bottom surface 21.

A lid 26 is secured to the lip 18 of the container 12. The lid 26 extends over the opening 14 and provides for an air-tight closure of the container 12, such that food product is able to be stored within the container 12 for a substantial period of time without spoiling. The lid 26 is connected to the lip 18. A scored area 28 is defined in the lid 26 to facilitate easy removal of a main portion 26A of the lid 26 to access the contained food product without the need for additional tools, for example, a can opener.

The container and closure assembly 10 further includes a closure 32. In use, the closure 32 is decoupled from the container 12 to thereby expose the lid 26. The main portion 26A of lid 26 is then separated from a remaining portion 26B of the lid 26 to thereby create an opening through which food product may be removed from the container 23. A pull tab (not shown) or the like may be attached to the main portion 26 to assist in separation of the main portion 26A from the remaining portion 26B as is conventional in the art. Thereafter, the closure 32 is coupled to the container 12 and the assembled container 12 and closure 32 is placed in a microwave for heating of the food product contained in the container 12.

The container 12 may have any shape which is suitable to contain a food product. For example, the container 12 may have a generally cylindrical shape, a generally oval shape, a generally rectangular or other polygonal shape, or any other shape capable of holding a food product therein. The closure 32 may have any shape that corresponds for attachment to the lip 18 of the container 12.

Figure 2:
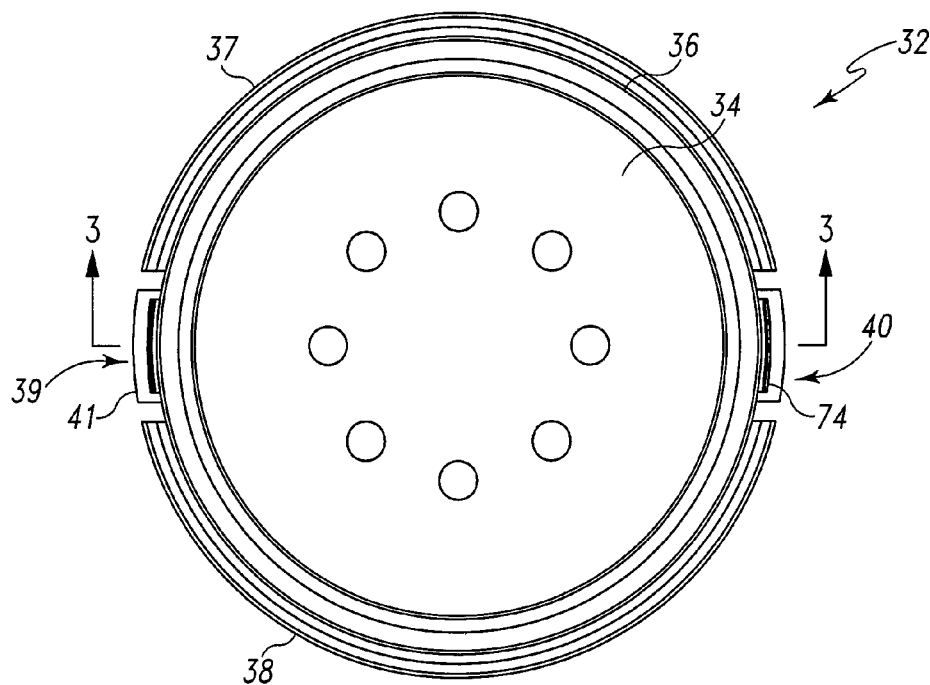
FIG. 2 is a top elevational view of the closure of the container and closure assembly of FIG. 1.
Figure 3:
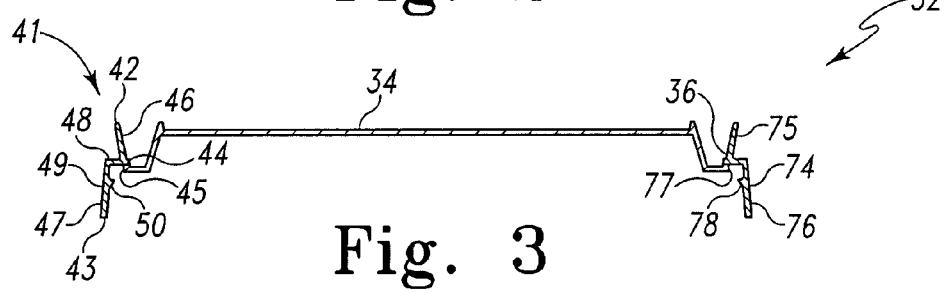
FIG. 3 is a cross sectional view of the closure of FIG. 2 taken along the line 3-3 of FIG. 2.
Figure 4:
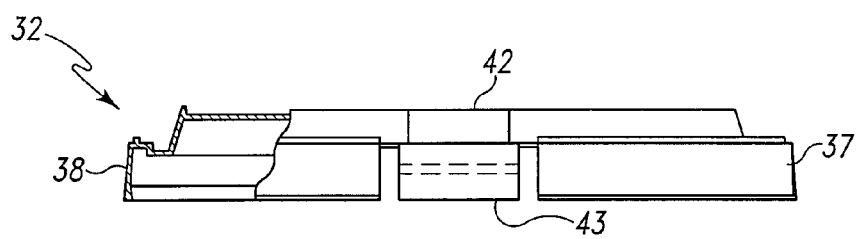
FIG. 4 is a partial side elevational view, partial cross sectional view, of the closure of FIG. 2.

Referring now to FIGS. 2, 3, and 4, the closure 32 is shown in greater detail. The closure 32 includes a top portion 34 that defines a periphery 36. The closure 32, as shown in FIGS. 2 and 4, includes a first skirt portion 37 which extends from the periphery 36. The closure 32 further includes a second skirt portion 38 that extends from the periphery 36. The second skirt portion 38 is spaced apart from the first skirt portion 37 so as define a first space 39 between the first skirt portion 37 and the second skirt portion 38. The first skirt portion 37 and second skirt portion 38 further defines a second space 40 positioned between the first skirt portion 37 and second skirt portion 38.

A first latch member 41 is positioned within the first space 39. The first latch member 41, as shown in FIG. 3, has a top end 42 and a bottom end 43. A hinge 44 is connected to the latch member 41 at a connection location 45. The hinge 44 is further connected to the top portion 34 at the periphery 36. Thus, the hinge pivotably couples the first latch member 41 to the top portion 34 of the closure 32.

As shown in FIG. 3, the first latch member 41 includes an actuator portion 46 which extends from the connection location 45 to the top end 42 of the first latch member 41. The first latch member 41 also includes a follower portion 47 which extends from the connection location 45 to the bottom end 43 of the first latch member 41. The follower portion 47 of the first latch member 41 includes a first follower segment 48 which extends from the connection location 45, and a second follower segment 49 which extends from the first follower segment 48. The second follower segment 49 includes a blocking structure 50.

Figure 5:
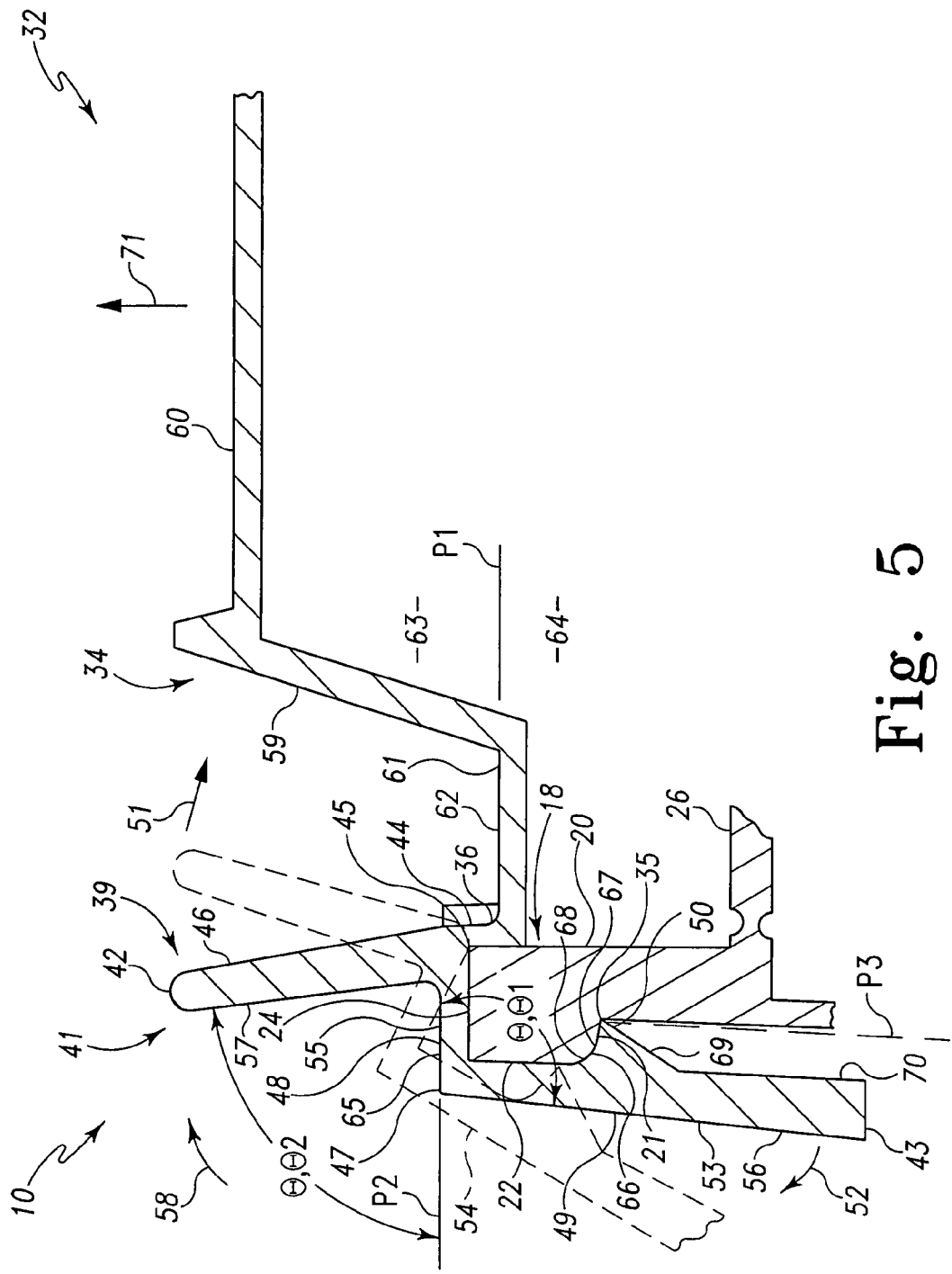
FIG. 5 is an enlarged fragmentary, cross sectional view of the container and closure assembly of FIG. 1.

Referring now to FIG. 5, the first latch member 41 of the closure 32 is shown enlarged in relation to FIG. 3. As can be seen in FIG. 5, the actuator portion 46 is configured such that movement of the actuator portion 46 causes movement of the second follower segment 49 of the follower portion 47.

For example, if the actuator portion 46 is pushed inwardly in the direction of arrow 51, the second follower segment 49 advances in the direction of arrow 52. As the second follower segment 49 advances in the direction of arrow 52, it should be appreciated that the blocking structure 50 moves from its engagement with lip 18 of the container 12, thereby permitting removal of the closure 32 from the container 12.

As shown in FIG. 5, the second follower segment 49 is moveable between a first position 53 (shown in solid) in which the blocking structure 50 is positioned in contact with the lip 18 of the container 12, and a second position 54 (shown in phantom) in which the blocking structure 50 is spaced apart from the lip 18 of the container 12.

When the second follower segment 49 is positioned in the first position 53, the first follower segment 48 is positioned in contact with the top surface 24 of the lip and the hinge 44 is positioned in contact with the inner surface 20 of the lip 18.

Thus, the second follower segment 49 serves to securely position the lip 18 against the closure 32.

Continuing to refer to FIG. 5, the lip 18 further includes the bottom surface 21. When the second follower segment 49 is positioned in the first position 53, the second follower segment 49 is positioned in contact with the bottom surface 21 of the lip 18 and the outer surface 22 of the lip 18.

The container and closure assembly 10 is configured such that the hinge 44 is positioned in contact with the inner surface 20 of the lip 18 when the second follower segment 49 is positioned in the second position 54 as shown in phantom. Thus, with this configuration, the hinge 44 remains in contact with the inner surface 20 of the lip 18 as the second follower segment 49 is advanced in the direction of arrow 52.

The container and closure assembly 10 of FIG. 5 is configured such that the first follower segment 48, when viewed in cross section as (shown in FIG. 5), defines a first linear outer surface segment 55. The second follower segment 49, when viewed in cross section, defines a second linear outer surface segment 56. The first linear outer surface segment 55 and the second linear outer surface segment 56 define an angle θ1. The angle θ1 may be between 70 degrees and 110 degrees. The angle θ1 is chosen to provide the proper functionality of the closure 32. It should be appreciated that angles outside of the range of angles θ1 may function to some degree within the scope and spirit of the present disclosure.

The container and closure assembly 10, as shown in FIG. 5, is configured such that the actuator portion 46, when viewed in cross section, defines a third linear outer surface segment 57. The first linear outer segment 55 and the third linear outer surface segment 57 are arranged to define an angle θ2. The angle θ2 may be between 80 degrees to 100 degrees. The angle θ2 is configured such that the movement of the latch member 41 from first position 53 to second position 54 may be facilitated.

The container and closure assembly 10 of the present disclosure, as shown in FIG. 5, is preferably configured such that the angle θ1 is an obtuse angle or an angle greater than 90 degrees and the angle θ2 is configured such that the angle θ2 is preferably an acute angle or less than or equal to 90 degrees.

The container and closure assembly 10 of FIG. 5 may be configured such that the first linear outer surface segment 55 and the second linear outer surface segment 56 may be arranged to define an obtuse angle θ1, where θ1 is greater than 90 degrees. The obtuse angle θ1 may be from, for example, 90 degrees to 110 degrees.

The container and closure assembly 10 may be configured such that the first linear outer surface segment 56 and the third linear outer surface segment 57 may define an acute angle θ2 between the first linear outer surface segment 56 and the third linear outer surface segment 57. The angle θ2 may be configured such that the angle θ2 is from about 70 degrees to about 90 degrees.

It should be appreciated that the shape and dimensions of the latch member 41 and the top portion of the closure 32 may be uniform regardless of the cross section cut through the closure 32, as long as the cut is through the latch member 41 and passes through the vertical centerline of the closure 32. It should also be appreciated that portions of the latch member may conversely not be uniform at various cross sections. For example, the actuation portion 46 and the follower portion 47 may be rounded or truncated at the ends thereof.

As shown in FIG. 5, the container and closure assembly 10 is configured such that movement of the actuator portion 46 further causes the latch member 41 to pivot in relation to the top portion 34 of the closure 32. By configuring the closure 32 with the hinge 44 positioned between the actuator portion 46 and the follower portion 47, the latch member 41 may pivot in the direction of arrow 58 with respect to the top portion 34.

As shown in FIG. 5, the container and closure assembly 10 is configured such that the movement of the first latch member 41 in the direction of arrow 52 causes the hinge 44 to bend. By providing the latch member 41 and the top portion 34 with a more rigid construction than that of the hinge, the relative motion of the first latch member 41 with respect to the top portion 34 in a pivoting manner will cause the closure 32 to bend at the hinge 44. The hinge 44 may be a living hinge and have a thickness less than that of the top portion 34 and the latch member 41. The thickness of the hinge 44 may be uniform or may include one or more areas (not shown) of even less thickness to ease the bending of the hinge 44.

The top portion 34 of the closure 32 may have any suitable shape and may, for example, have a simple, planar shape of a constant thickness. Alternatively, the top portion 34 may include reinforcements for adding strength to the top portion 34. For example, the top portion 34 may include an intermediate segment 59 positioned between an inner segment 60 and an outer segment 61. The intermediate segment 59 may be positioned at an angle with respect to the inner segment 60 and outer segment 61 to provide additional rigidity to the top portion 34.

As shown in FIG. 5, the outer segment 61 defines the periphery 36 of the top portion 34. The outer segment 61 further defines a planar top surface 62. The planar top surface 62 defines a plane P1. The first follower segment 48 is positioned on a first side 63 of the plane P1 and the blocking structure 50 is positioned on a second side 64 of the plane P1.

The first follower segment 48, as shown in FIG. 5, defines a planar outer surface 65. The planar outer surface 65 defines a second plane P2. The first plane P1 is positioned below the second plane P2. The first plane P1 and the second plane P2 are arranged such that the first plane P1 and the second plane P2 are parallel to each other. The container and closure assembly 10 of the present disclosure is configured such that the hinge 44 is interposed between the first plane P1 and the second plane P2. As shown in FIG. 5, the second linear outer surface segment 56 does not lie in the second plane P2.

The container and closure assembly 10 of the present disclosure, as shown in FIG. 5, is configured such that the lip 18 defines a first radiused surface 66. The first radiused surface 66 is positioned between outer surface 22 and bottom surface 21 of the lip 18. The blocking structure 50 defines a second radiused surface 67. The first radiused surface 66 of the lip 18 is configured to be complementary to the second radiused surface 67 of the blocking structure 50.

As shown in FIG. 5, the second follower segment 49, when positioned in the first position 53 (shown in solid) is configured such that the first radiused surface 66 of the lip 18 of the container 12 is positioned in contact with the second radiused surface 67 of the blocking structure 50 of the closure 32. It should be appreciated that other mating structures of the lip 18 and the blocking structure 50 may be utilized to provide for complimentary mating between the bottom surface 21 and outer surface 22 of the lip 18 and corresponding portions of the blocking structure 50, to provide for a mating fit and to ease the movement of the second follower segment 49 from the first position 53 to the second position 54.

The blocking structure 50, as shown in FIG. 5, has a shape capable of cooperation with the lip 18 to secure the closure 32 to the lip 18. The blocking structure 50 may have a structure, as shown in FIG. 5, including a first surface 68 for cooperation with bottom surface 21 of the lip 18. It should be appreciated that the upper surface 68 of the blocking structure 50 has a shape for close conformance with bottom surface 21 of the lip 18, including the second radiused surface 67. The blocking structure 50 further has a second face 69 which extends from second radiused surface 67 to inner surface 70 of the second follower segment 49.

Figure 5A:
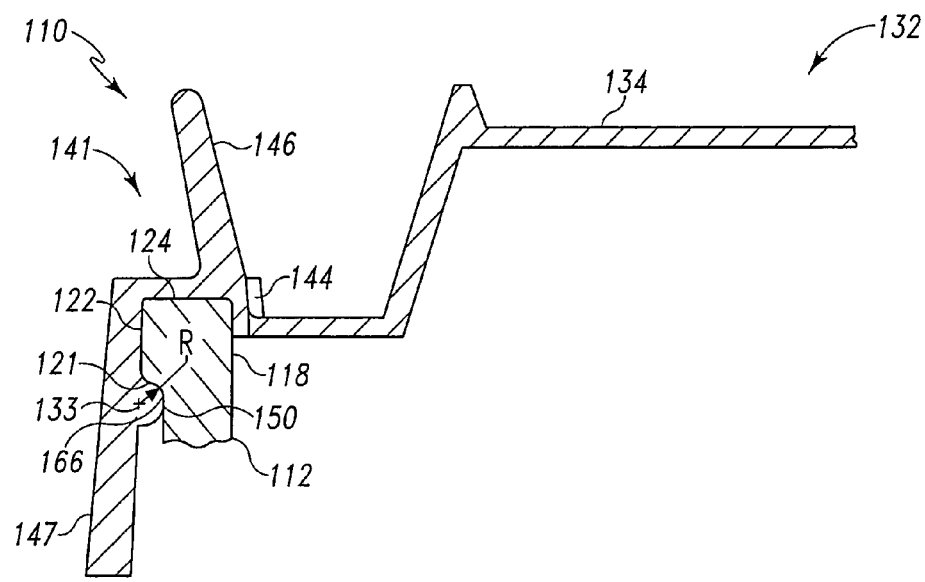
FIG. 5A is a view similar to FIG. 5, but showing an alternative blocking structure having a hemispherical cross section.

Referring now to FIG. 5A, there is shown another container and closure assembly 110 according to another embodiment of the present disclosure. The assembly 110 is similar to the assembly 10 of FIGS. 1-5 and includes a closure 132 that is removably secured to a lip 118 of a container 112. The container 112 is identical to the container 12 of FIGS. 1 and 5. The lip 118 includes a top surface 124, a bottom surface 121 and an outer surface 122.

The closure 132 is similar to the closure 32 of FIGS. 1-5 and includes a top portion 134 identical to the top portion 34 of the closure 32 of FIG. 2. The closure 132 may also include a hinge 144 similar to the hinge 44 of the closure 32 of FIG. 2 and a latch member 141 pivotally connected to the hinge 144.

The latch member 141 is somewhat different than the latch member 41 of the closure 32 of FIG. 2 in that the latch member includes a blocking structure 150 that is different in configuration in relation to the blocking structure 50 of the closure 32 of FIG. 2. The latch member 141 includes an actuator portion 146 that is identical to the actuator portion 46 of the closure 32 of FIG. 2. The latch member 141 also includes a follower portion 147 that is similar to follower portion 47 of the closure 32 of FIG. 2, except that the blocking structure 150 has a generally semicircular cross section defined by radius R extending from origin 133. The radius R may be sized and positioned to mate with a first radiused surface 166 of the lip 118.

Figure 5B:
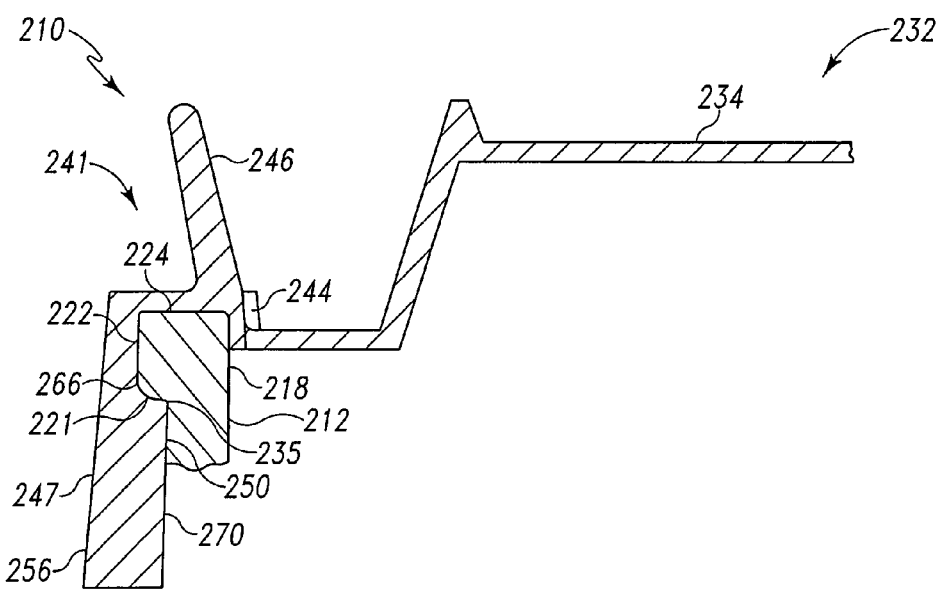
FIG. 5B is a view similar to FIG. 5, but showing another alternative blocking structure having a generally rectangular cross section.

Referring now to FIG. 5B, there is shown another container and closure assembly 210 according to another embodiment of the present disclosure. The assembly 210 is similar to the assembly 10 of FIGS. 1-5 and includes a closure 232 that is removably secured to the lip 218 of container 212. The container 212 is identical to container 12 of FIGS. 1 and 5. The lip 218 includes a top surface 224, a bottom surface 221 and an outer surface 222.

The closure 232 is similar to the closure 32 of FIGS. 1-5 and includes a top portion 234 that is identical to the top portion 34 of the closure 32 of FIG. 2. The closure 232 may also include a hinge 244 identical to the hinge 44 of the closure 32 of FIG. 2 and a latch member 241 pivotally connected to the hinge 244.

The latch member 241 is somewhat different than the latch member 41 of the closure 32 of FIG. 2 in that the latch member includes a blocking structure 250 that is different in comparison to the blocking structure 50 of the closure 32 of FIG. 2. The latch member 241 includes an actuator portion 246 that is identical to the actuator portion 46 of the closure 32 of FIG. 2. The latch member 241 also includes a follower portion 247 that may be generally similar to follower portion 47 of the closure 32 of FIG. 2, except that inner surface 270 of follower portion 247 extends downwardly from an inner edge 235 of the blocking structure 250. Outer surface 256 of follower portion 247 may be spaced from and parallel to inner surface 270 of follower portion 247. The blocking structure 250 is sized and positioned to mate with a first radiused surface 266 of lip 218.

Figure 5C:
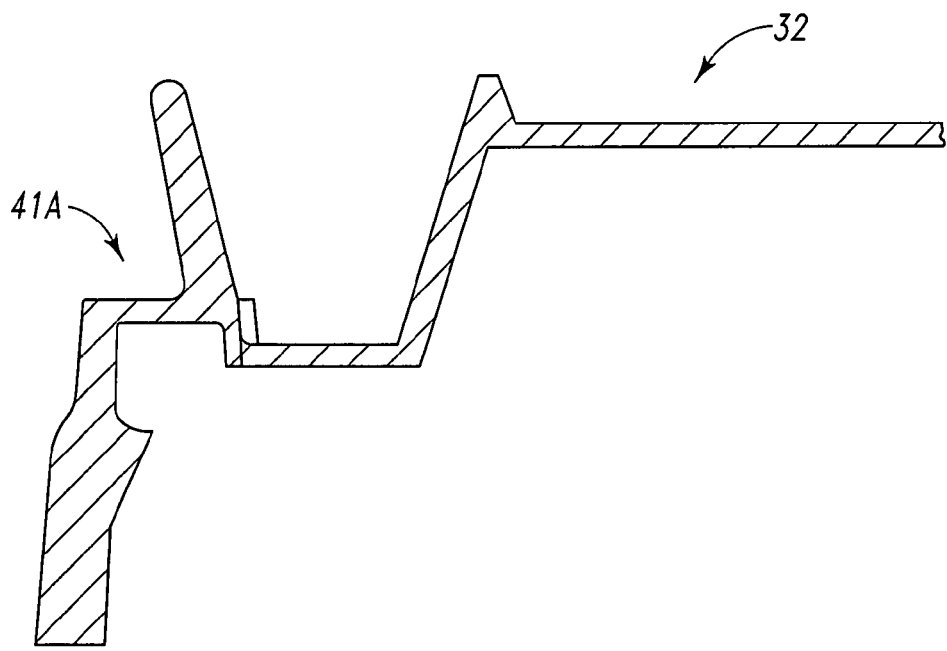
FIGS. 5C and 5D are views similar to FIG. 5, but showing yet other alternative blocking structures.
Figure 5D:
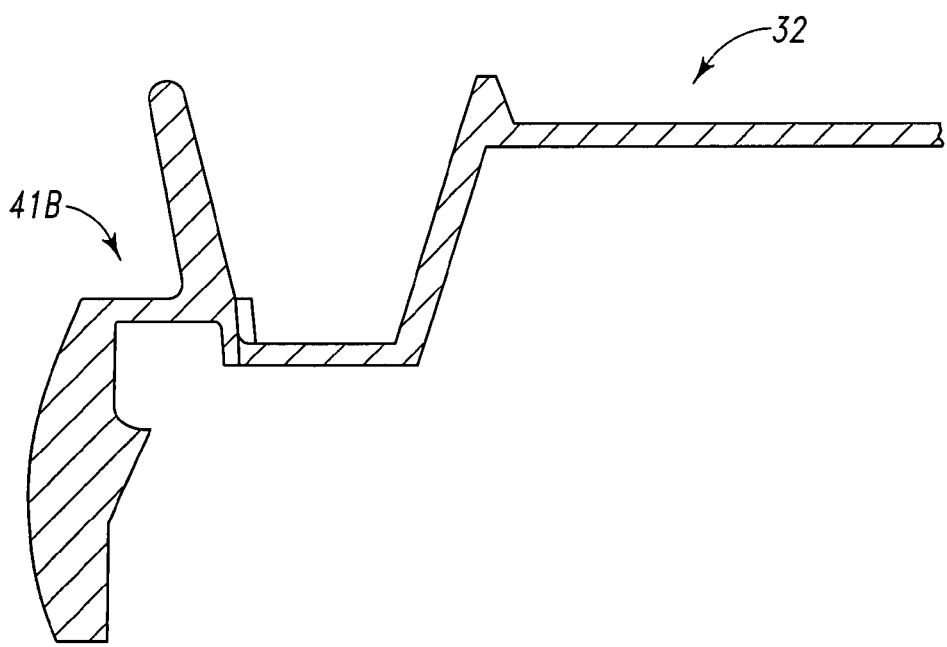

FIGS. 5C and 5D show other alternative configurations of latch members 41A and 41B which are similar to latch members 41, 141, and 241.

Referring again to FIGS. 2, 3 and 4, the closure 32 of the present disclosure includes a second latch member 74. The second latch member 74 is positioned in the second space 40 formed between the first skirt portion 37 and the second skirt portion 38. The second latch member 74 is identical to the first latch member 41. The second latch member 74 may includes actuator portion 75 and a follower portion 76. The second latch member 74 is pivotally coupled to the top portion 34 of the closure 32 via a hinge 77. The hinge 77 is identical to the hinge 44 of the first latch member 41.

The actuator portion 75 of the second latch member 74 is identical to the actuation portion 46 of the first latch member 41 and the follower portion 76 of the second latch member 74 is identical to the follower portion 47 of the first latch member 41. The second latch member 74 includes a blocking structure 78 identical to the blocking structure 50 of the first latch member 41.

The latch members 41 and 74 serve to provide an easy, simple and intuitive opening and removal of the closure 32 from the container 12. For example and as shown in FIGS. 3 and 4, the actuator portion 46 of the first latch member 41 and the actuation portion 75 of the second latch member 74 extend outwardly and upwardly with respect to the closure 32 providing a portion of the closure 32 that a user may intuitively and simply touch and squeeze as he or she lifts upwardly to easily remove the closure 32.

When reinstalling the closure 32 onto the container 12, for example after removal of the lid 26, the user merely pushes the closure 32 downwardly onto the lip 18 of the container 12 until the latch member 41 snaps onto the lip 18 of the container 12. Alternately, the user may grip and squeeze inwardly the actuation portions 42 and 75 of the latch members 41 and 74, respectively. The user may then place the closure 32 in position on the container 12 and release the latching members 41 and 74.

Figure 6:
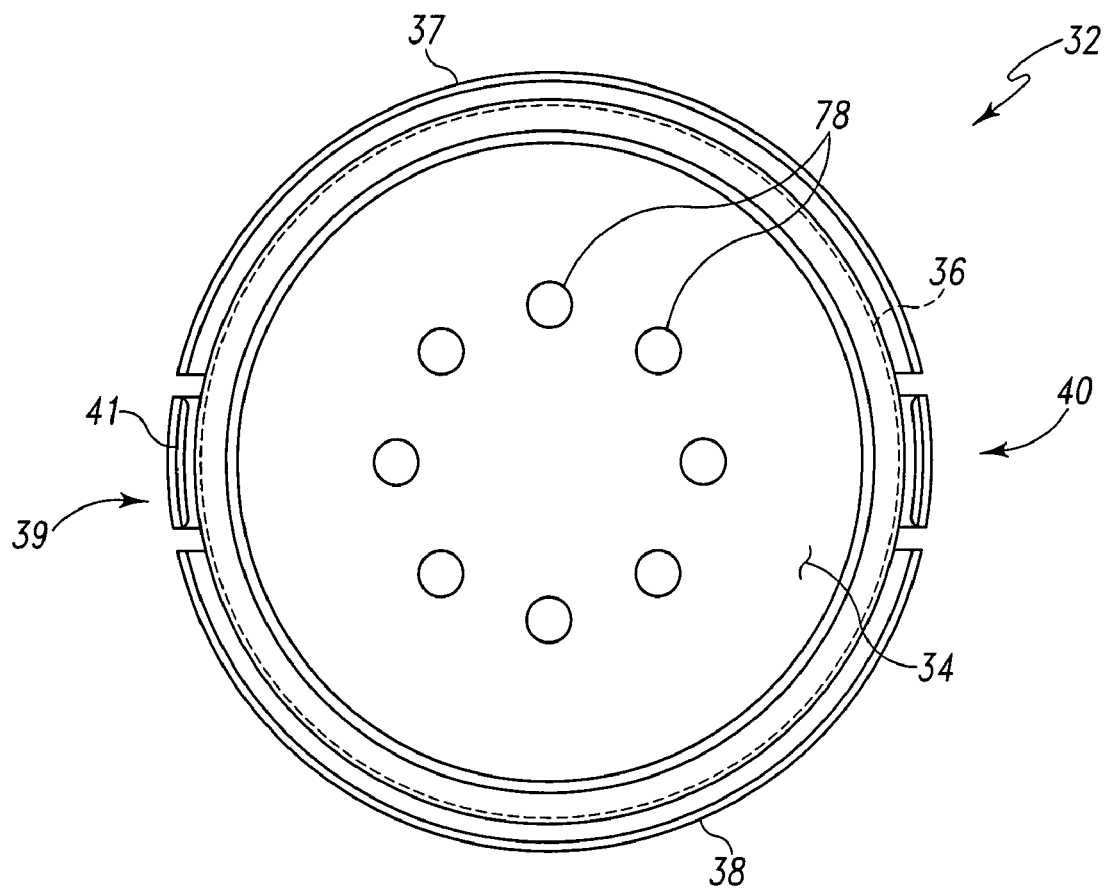
FIG. 6 is a bottom elevational view of the closure of FIG. 2.

Referring now to FIG. 6 the closure 32 includes openings or vents 78 formed in the closure 32. The vents 78 serve to permit water vapor and steam to evacuate from the container 12 of the container and closure assembly 10 of FIG. 1 as a result of heating the food product that is contained in the assembly 10 in a microwave oven. While a solitary vent 78 may be utilized, a grouping of spaced apart vents is preferable. The vents 78 may be randomly distributed or may be positioned in a uniformed pattern, such as a circular pattern, as shown in FIG. 6. Any number of vents may be utilized, for example and as shown in FIG. 6, eight vents 78 may be utilized.

The closure 32 may be made of any suitable durable material and may, for example, be made of a polymer or a metal material. Alternatively, the closure 32 may be made of a composite material. Preferably, the closure 32 is made of a plastic material that can withstand at least some exposure to heating in a microwave oven. The closure 32 may be made by any suitable process and, preferably is made by a molding process. The closure 32 may be molded in any type of molding equipment, but preferably is made in the type of molding equipment described below.

Figure 7:
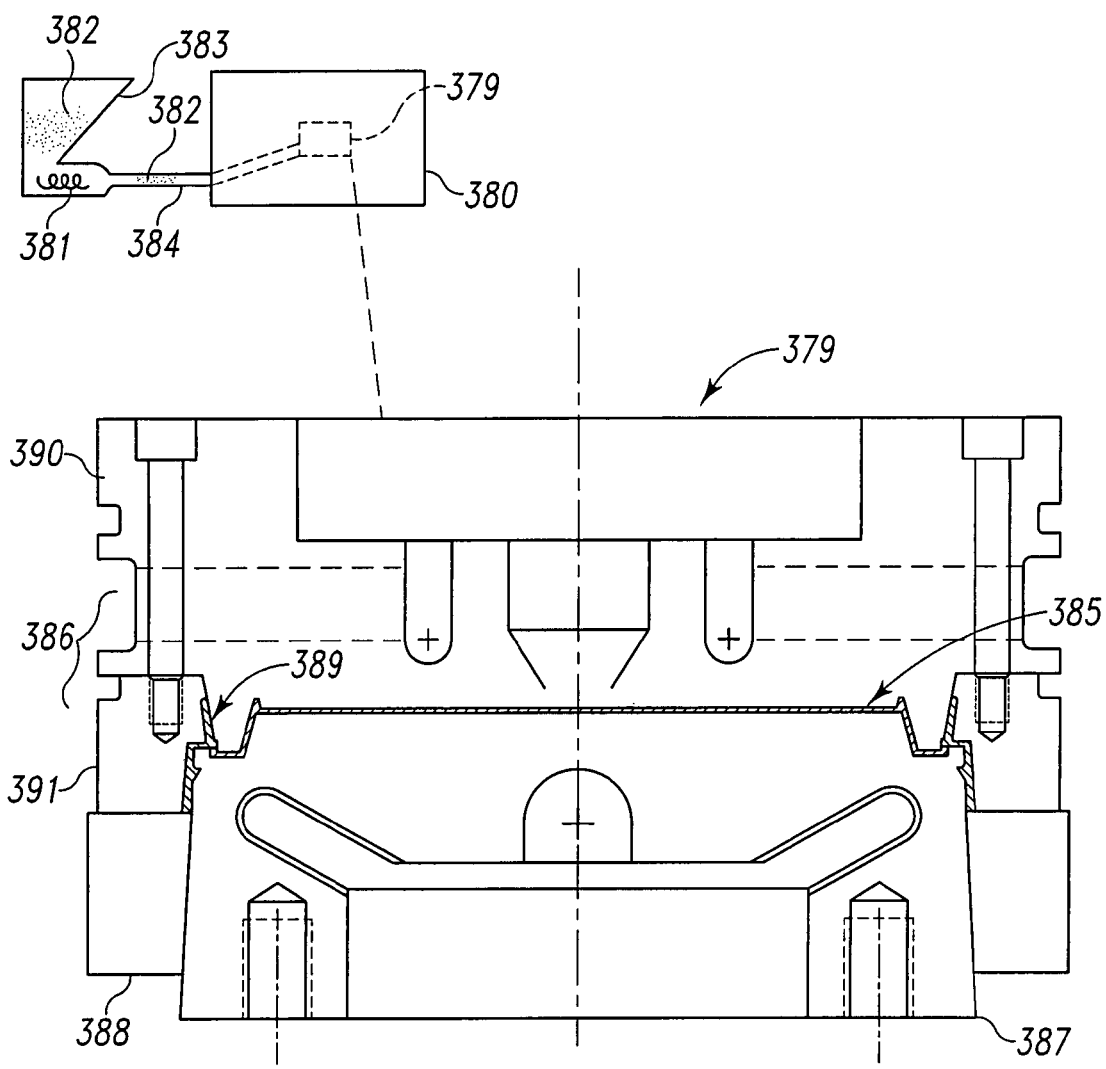
FIG. 7 is a schematic view of a molding machine including a mold assembly according to another embodiment of the present disclosure, the mold assembly being configured to make the closure of FIG. 2.

Referring to FIG. 7, a mold assembly 379 is shown for use in a molding machine 380. The molding machine 380 may be any suitable molding machine and may for example include a piston (not shown) or a feed screw 381. The feed screw 381 may be utilized to feed material 382 in the form of pellets or granules of a polymer from a hopper 383 and to compress them into a fluid. The material is advanced through a conduit 384 to a space 385 formed in the mold assembly 379.

The space 385 of the mold assembly 379 has a shape similar to that of the closure 32 of FIGS. 1-6 and may be formed from a plurality of components forming the mold assembly 379. For example, as shown in FIG. 7, the mold assembly 379 may include a first mold portion 386 and an opposed second mold portion 387. The mold assembly 379 may further include a third mold portion 388. The first mold portion 386 may be integral. Alternatively and as is shown in FIG. 7, to more easily provide for a first sub space 389 of the space 385, the first mold portion 386 may be modular and include a first portion 390 and second portion 391.

Referring now to FIG. 8-11, a preferred process 400 for making a closure according to the present disclosure is shown. The process 400 is utilized for making a closure having a top portion, a latch member that includes an actuator portion, and a follower portion. The follower portion includes a blocking structure. The closure further includes a hinge connecting the latch member to the top portion.

Figure 8:
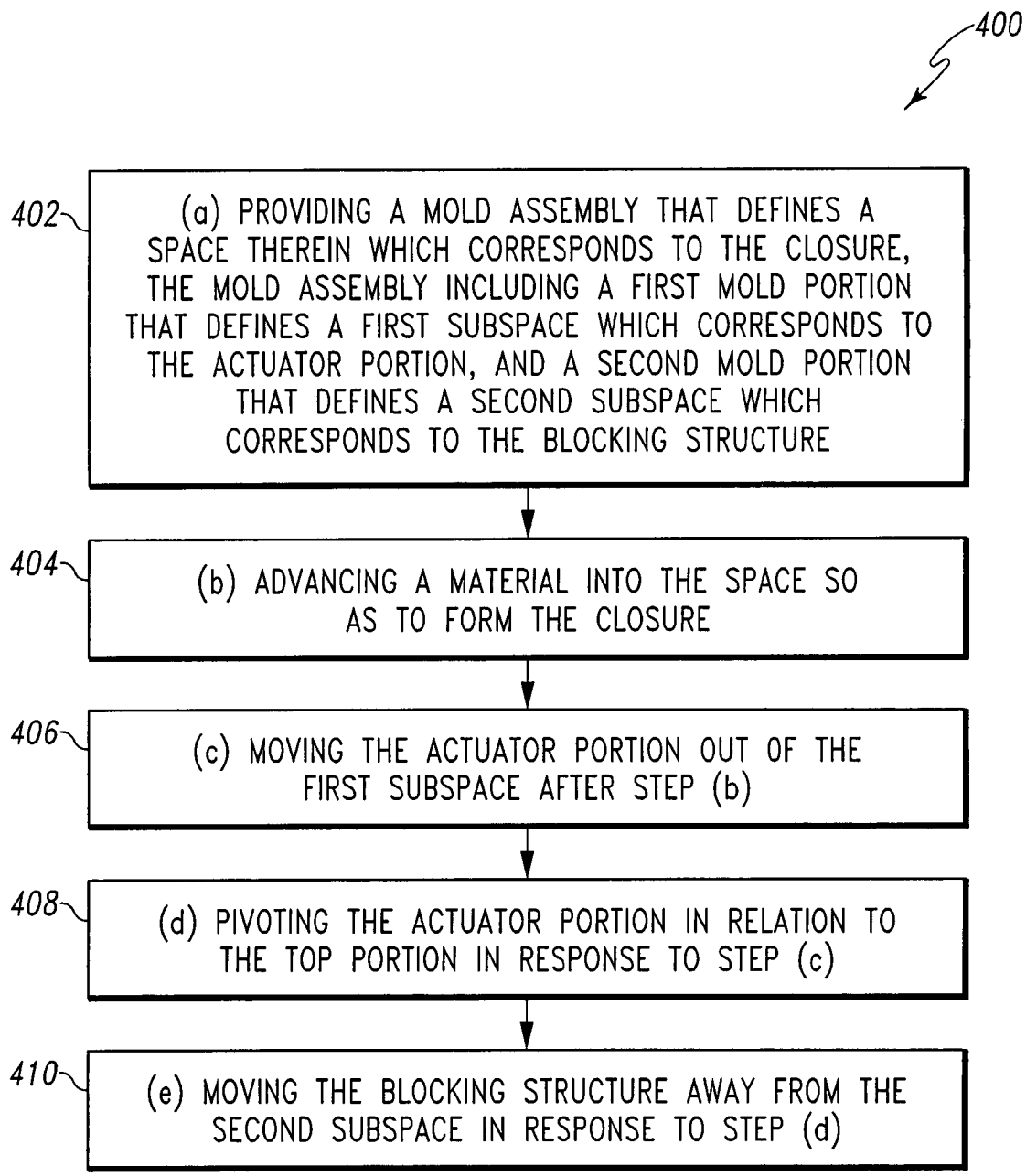
FIG. 8 is a flow diagram of a process for making the closure of FIG. 2 according to an embodiment of the present disclosure.
Figure 9:
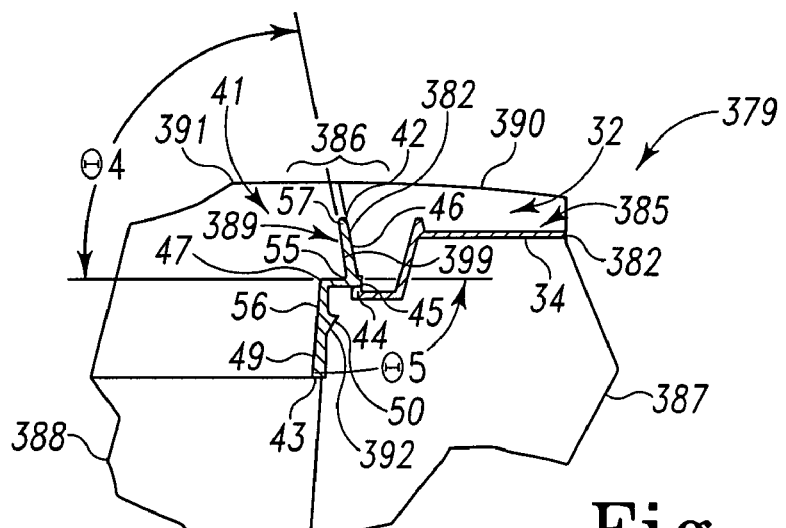
FIG. 9 is a cross sectional view of the mold assembly of FIG. 7 during the manufacture of the closure of FIG. 2, with the mold portions of the mold assembly being arranged to form the closure.

Referring now to FIG. 9, a closure made by the process 400 of FIG. 8 is identical to the configuration of the closure 32. The closure 32 includes the top portion 34 and the latch member 41. The latch member 41 includes the actuator portion 46 and the follower portion 47. The follower portion 47 includes the blocking structure 50. The closure 32 further includes the hinge 44 which connects the latch member 41 to the top portion 34 of the closure 32.

Referring again to FIG. 8, the process 400 includes a step 402 of providing a mold assembly that defines a space in the mold assembly. The space corresponds to the closure. The mold assembly includes a first mold portion that defines a first sub space. The first sub space corresponds to the actuator portion. The molding assembly further includes a second mold portion that defines a second sub space which corresponds to the blocking structure.

To better understand the step 402 of the process 400 and referring again to FIG. 9, the mold assembly of the process 400 may be in the form of mold assembly 379. The mold assembly 379 defines the space 385 in the mold assembly 379. The space 385 corresponds to the closure 32. The mold assembly 379 includes the first mold portion 386 that defines the first sub space 389. The first sub space 389 corresponds to the actuator portion 46 of the closure 32 of FIGS. 1-6. The mold assembly 379 also includes the second mold portion 387 which defines a second sub space 392 which corresponds to the blocking structure 50 of the closure 32.

Referring again to FIG. 8, the process 400 further includes a step 404 of advancing a material into the space so as to form the closure. For example and referring to FIG. 9 the material may be in the form of material 382. The material is preferably a polymeric material. The material 382 is converted, as shown in FIG. 7, from pellets to a fluid and advanced into the space 385 of the mold assembly 379. The space 385 has a shape such that it may be used to form the closure 32.

Referring again to FIG. 8, the process 400 also includes a step 406 of moving the actuator out of the first subspace after the step 404.

Figure 10:
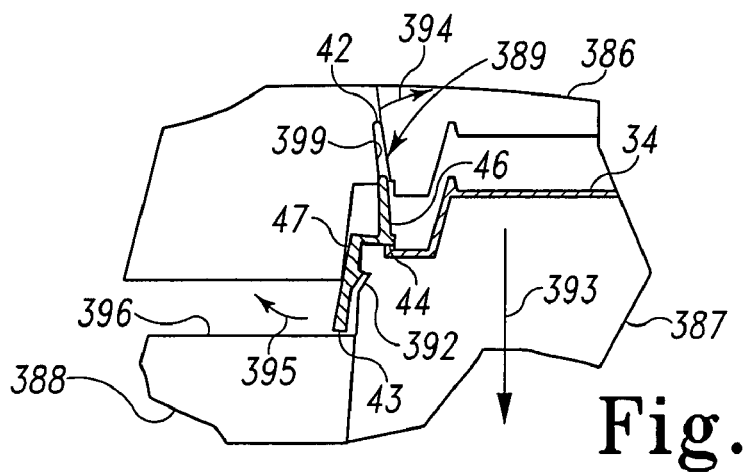
FIG. 10 is a cross sectional view of the mold assembly of FIG. 7 during the manufacture of the closure of FIG. 2, with the first and second mold portion of the mold assembly being arranged in a separated condition at a point during the removal of the formed closure from the mold assembly.

Referring now to FIG. 10 the actuator portion 46 of the closure 32 is shown being moved out of first sub space 389. While the step 406 may be performed in any suitable way, as shown in FIGS. 9 and 10, the first mold portion 386 is separated from the second mold portion 387 along arrow 393 to remove the actuator portion 46 from the first sub space 392.

Referring again to FIG. 8 the process 400 further includes a step 408 of pivoting the actuator portion in relation to the top portion in response to step 406. For example and as shown in FIGS. 9 and 10, the actuator portion 46, as shown in FIG. 10, is caused to move in the direction of arrow 394 such that the actuator portion 46 pivots in relation to the top portion 34 of the closure 32 in response to the step 406.

Referring again to FIG. 8, the process 400 further includes step 410 of moving the blocking structure away from the second sub space in response to the step 408. For example and as shown in FIG. 10, as the actuator portion 46 rotates in the direction of arrow 394, the follower portion 47 rotates in the direction of arrow 395. The blocking structure 50 moves away from the second sub space 392 in response to step 408.

Figure 11:
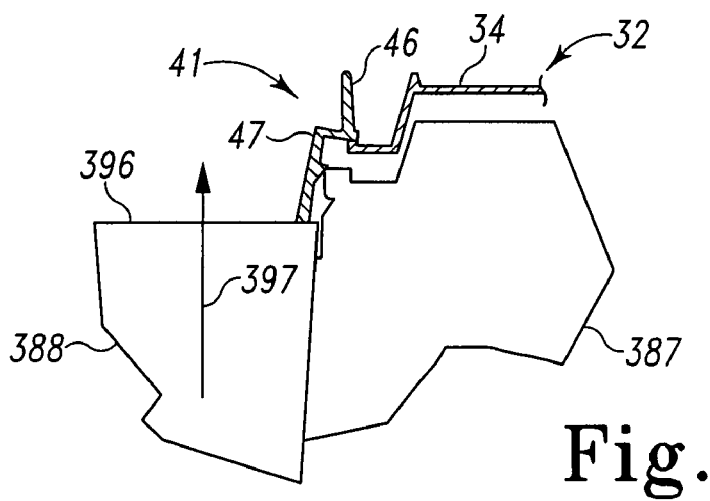
FIG. 11 is a partial cross sectional view of the mold assembly of FIG. 7 during the manufacture of the closure of FIG. 2, with the second and third mold portions of the mold assembly being arranged in a separated condition at another point during the removal of the formed closure from the mold assembly.

The mold assembly 379, as shown in FIGS. 9, 10 and 11, may only have the first mold portion 386 and the second mold portion 387. In such a configuration, the bottom end 43 of the closure 32 may be formed from a step (not shown) extending from the second mold portion 387 of the mold assembly 379. Alternatively and as shown in FIGS. 7-9, the mold assembly 379 may further include the third mold portion 388.

The process 400 of FIG. 8 may further include the step of advancing the third mold portion 388 into contact with the follower portion 47 of the closure 32 while at least part of the blocking structure 50 is located outside of the second sub space 392. Such a motion is shown in FIGS. 10 and 11, with the top surface 396 of the third mold portion 388 in contact with bottom end 43 of the closure 32.

The process 400 of FIG. 8 may further include moving the third mold portion 388 with respect to the second mold portion 387. Such movement is shown in FIG. 11 with the third mold portion 388 being moved upwardly in the direction of arrow 397 with respect to the second mold portion 387.

In the process 400 of FIG. 8, the step 406 includes the step of moving the second mold portion 387 in relation to the first mold portion 386. For example and referring to FIG. 9, the first mold portion 386 is shown in position close to the first mold portion 387 such that the space 385 defines the closure 32. In FIG. 10, the second mold portion 387 is shown moved downwardly in the direction of arrow 393 with respect to the first mold portion 386.

The third mold portion 388 may move in relation to the first mold portion 386 as the second mold portion 387 is moved in relation to the first mold portion 386. This is shown in FIGS. 9 and 10.

Referring now to FIG. 11, the third mold portion 388 may be moved, for example, in the direction of arrow 397 with respect to second mold portion 387.

Referring now to FIGS. 9 and 10, the hinge 44 of the closure 32 bends to permit the movement of the actuator portion 46 with respect to the top portion 34 of the closure 32. This motion of the actuator portion 46 with respect to the top portion 34 occurs as top end 42 of the actuator portion 46 is required to move in the direction of arrow 394 as the second mold portion 387 moves in the direction of arrow 393.

The first mold portion 386 as shown in FIG. 9 may have an internal wall 399 that defines at least in part the first sub space 389. The step 408 of pivoting the actuator portion may include applying force to the actuator portion 46 with the internal wall 399 during movement of the second mold portion 387 in relation to the first mold portion 386 in the direction of arrow 393 (see FIGS. 9 and 10).

The material 382 for use in the mold assembly 379 may be any suitable material and may, for example, be a polymer. Alternatively the material 382 may be a composite, a powdered metal, or any other material that may operate in a molding machine.

Referring again to FIG. 9, the method 400 of FIG. 8 may be performed when the latch member 41 has top end 42 and bottom end 43. The hinge 44 may be connected to the latch member 41 at the connection location 45. The actuator portion 46 of the latch member 41 may extend from the connection location 45 to the top end 42. The follower portion 47 may extend from the connection location 45 to the bottom end 43. The follower portion of the latch member 41 may include the first follower segment 48 extending from the connection location 45 and the second follower segment 49 extending from the first follower segment 48. The second follower segment 49 may include the blocking structure 50.

The first follower segment 48 when viewed in cross section as shown in FIG. 9 may define the first linear outer surface segment 55. The second follower segment 49 when viewed in cross section may define the second linear outer surface segment 56. The actuator portion 46 when viewed in cross section may define the third linear surface segment 57. The first linear outer segment 55 and the third linear outer surface segment 57 may be arranged to define an acute angle θ4. The angle θ4 may be, for example, between 70 and 90 degrees.

The first linear outer surface segment 55 and the second linear outer surface segment 56 may be arranged to define an obtuse angle θ5. The obtuse angle θ5 may be between 90 degrees and 120 degrees, and the acute angle θ4 may be from example between 70 degrees and 90 degrees. The obtuse angle θ5 assists in permitting the second linear outer surface segment 56 to be formed from the first mold portion 386. The obtuse angle θ5 permits the segment 56 to separate from the first mold portion 386 as the second mold portion is moved in the direction of arrow 393. The space formed between the segment 56 and the first mold portion 386 allows the second follower segment 49 to move in the direction of arrow 395, as shown in FIG. 10.

Referring again to FIGS. 9, 10 and 11, the mold assembly 379 and the closure 32 is configured such that the separation of the second mold portion 387 from the first mold portion 386 causes the blocking structure 50 to separate from the second sub space 392 such that the closure 32 is separated from the space 385 and removed from the mold assembly 379. It may be, however, that to positively remove the closure 32 from the mold assembly 379, the surface 396 of the third mold portion 388 may need to be moved in the direction of arrow 397 as shown in FIG. 11. The surface 396 of the third mold portion 397 then contacts the bottom end 43 of the follower portion 47 of the latch member 41 to eject the closure 32 from the mold assembly 379.

It should be appreciated, particularly if the third mold portion 388 is used to eject the closure 32, that the blocking structure 50 may not need to be completely removed from the second sub space 392 for the third mold portion 388 to effectively eject the closure 32 from the mold assembly 379.

It should be appreciated that the mold assembly 379, in order to make the closure 32 of FIGS. 1-6, includes surfaces (not shown) in the space 385 to make the skirt portions 37 and 38, as well as, all other features of the closure 32 including the second latch member 74.

Figure 12:
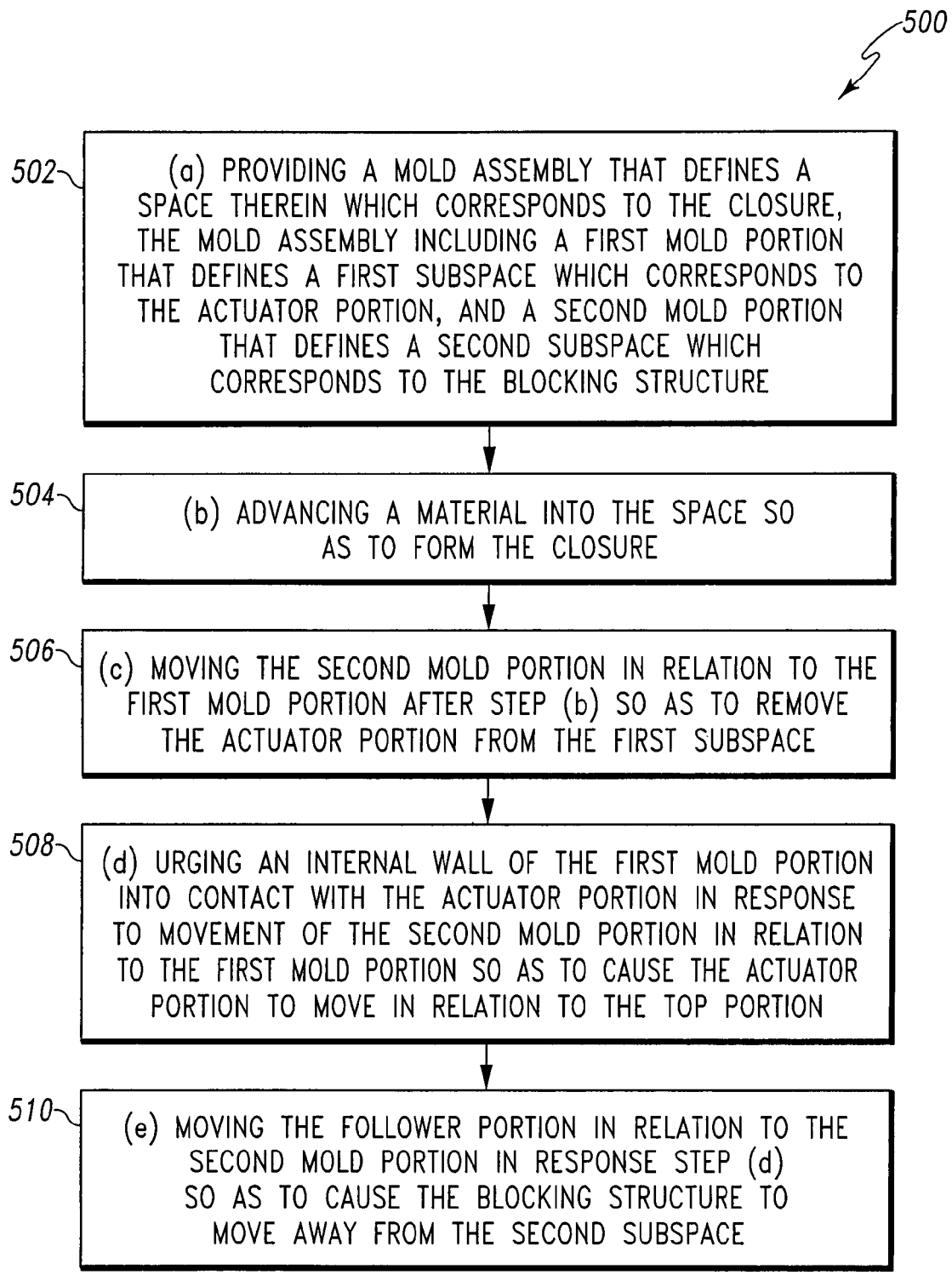
FIG. 12 is a flow diagram of an alternate process for making the closure of FIG. 2, according to another embodiment of the present disclosure.

Referring now to FIG. 12, yet another embodiment of the present invention is shown as process 500. The process 500 includes step 502 of providing a mold assembly that defines a space in the mold assembly. The space corresponds to the closure. The mold assembly includes a first mold portion that defines a first sub space which corresponds to the actuator portion. The mold assembly further includes a second mold portion that defines a second sub space which corresponds to the blocking structure. The method 500 further includes a step 504 of advancing a material into the space so as to form the closure.

The method 500 further includes a step 506 of moving the second mold portion in relation to the first mold portion after step 504 so as to remove the actuator portion from the first sub space. The method 500 further includes step 508 of urging an internal wall of the first mold portion into contact with the actuator portion in response to movement of the second mold portion in relation to the first mold portion so as to cause the actuator portion to move in relation to the top portion.

The method 500 further includes step 510 of moving the follower portion in relation to the second mold portion in response to step 508 so as the cause the blocking structure to move away from the second sub space. The process 500, as is shown in FIG. 12, may be more fully understood by reference to the mold assembly 379 as described in FIGS. 8-11 and to the closure 32 as shown in FIGS. 1-6.

Figure 13:
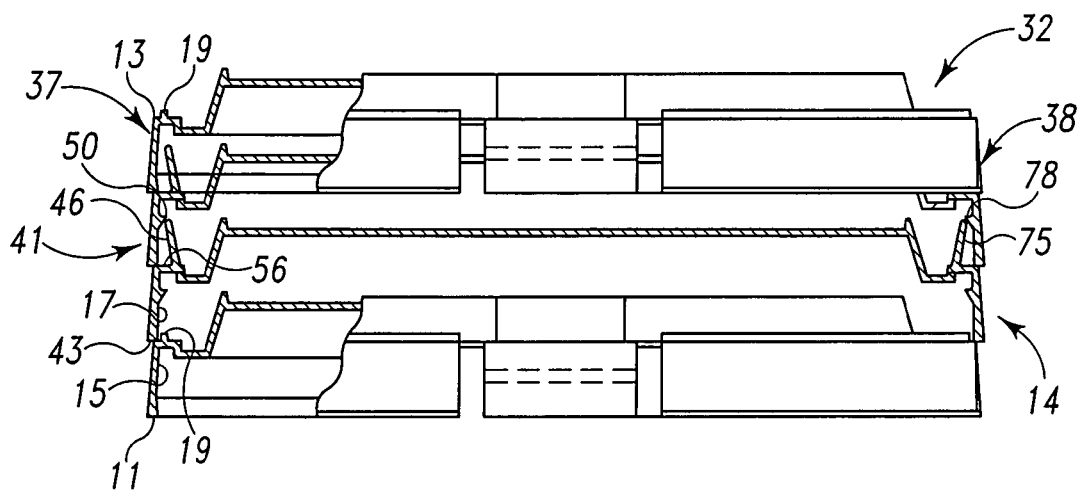
FIG. 13 is a side elevational view, partially in cross section, of four closures each being identical to the closure of FIG. 2 in a stacked arrangement suitable for storage of multiple closures.

Referring now to FIG. 13, the closure 32 is designed such that the closure 32 is easily and compactly stacked during storage in a packaging facility. The closure 32 includes a skirt bottom end 11 which is parallel with the bottom end 43 of the latch members 41 and 74. The skirt bottom end 11 of the skirt portions 37 and 38 and the bottom end 43 of the latch members 41 and 74 contact the first linear outer surface segment 55, as well as, the skirt top end 13. The skirt top end 13 and the first linear outer surface segment 55 may be parallel to each other for simplicity of stacking.

The actuator portions 46 and 75 of the closure 32 are configured such that the actuator portions 46 and 75 may be fitted inside and spaced from skirt inner face 15 of another closure 32 and may be spaced from or in contact with the blocking structure 50 of the latch members 41 and 74 of another closure 32. The actuator portion 46 of the latch member 41 and 74 and the blocking structures 50 and 78 may, when the closures 32 are stacked, assist in aligning touching closures 32.

Further, the skirt inner face 15 and latch inner face 17 may mate with a protrusion 19 extending from the skirt top end 13. The mating of protrusion 19 to the skirt inner face 15 and to the latch inner face 17 and the mating of the actuation portions 46 and 75 with the locking structures 50 and 78 provides for efficient stacking of the closures 32.

Figure 14:
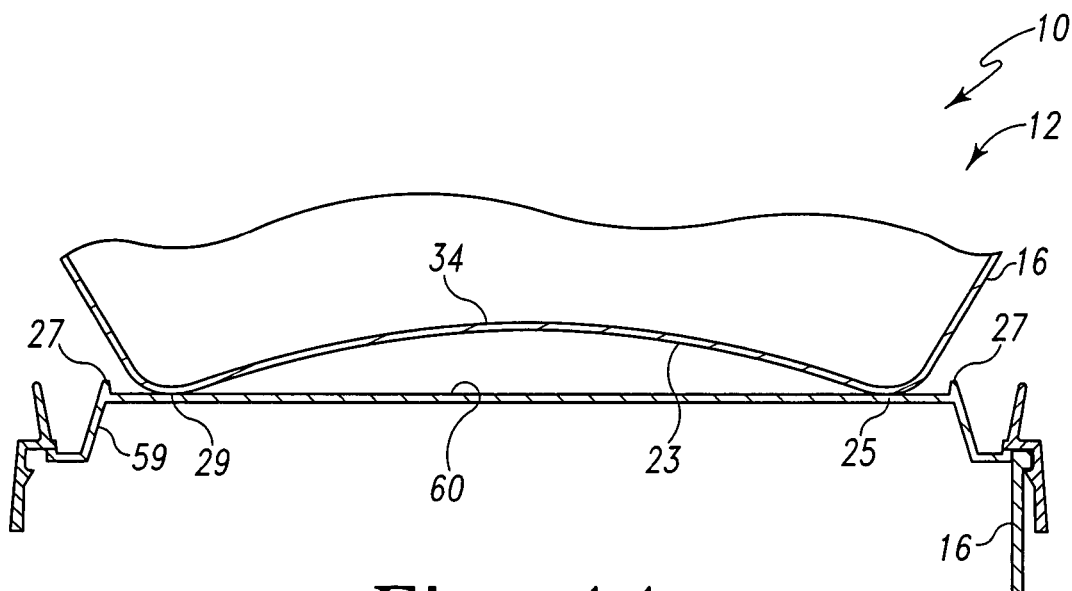
FIG. 14 is a fragmentary, cross sectional view of two container and closure assemblies in a stacked arrangement suitable for storage of multiple container and closure assemblies.

Referring now to FIG. 14, the container and closure assembly 10 is configured such that a number of container and closure assemblies 10 may be readily stacked upon each other. For example, inner segment 60 of the closure 32 of one assembly 10 may provide a surface for supporting a bottom surface 29 of the body 16 of the container 12 of an adjacent assembly 10. The bottom surface 29 includes a concave portion 23 for improving the rigidity of the container 12 and includes a bottom radiused portion 25 for contact with the inner segment 60 of the closure 32 of a juxtaposed assembly 10. An extension 27 of the intermediate segment 59 of the top portion 34 of the container 32 may be positioned closely to radiused portion 25 of the base 16 of the container 12 as shown in FIG. 14 to center juxtaposed assemblies 10. The configuration of the container 12 and the closure 32 of the assembly 10 provides for efficient stacking of the container and closure assemblies 10.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A process of making a closure having (i) a top portion, (ii) a latch member that includes an actuator portion and a follower portion, the follower portion including a blocking structure, and (iii) a hinge connecting the latch member to the top portion, comprising:
(a) providing a mold assembly that defines a space therein which corresponds to the closure, the mold assembly including (i) a first mold portion that defines a first subspace which corresponds to the actuator portion, and (ii) a second mold portion that defines a second subspace which corresponds to the blocking structure;

(b) advancing a material into the space so as to form the closure;

(c) moving the actuator portion out of the first subspace after step (b);

(d) pivoting the actuator portion in relation to the top portion in response to step (c); and (e) moving the blocking structure away from the second subspace in response to step (d).

2. The process of claim 1, wherein the mold assembly further includes a third mold portion, further comprising:

(f) advancing the third mold portion into contact with the follower portion while at least a part of the blocking structure is located outside of the second subspace.

3. The process of claim 2, wherein step (f) includes moving the third mold portion in relation to the second mold portion.

4. The process of claim 1, wherein step (c) includes the step of moving the second mold portion in relation to the first mold portion.

5. The process of claim 4, wherein step (c) further includes the step of moving the third mold portion in relation to the first mold portion.

6. The process of claim 1, wherein the hinge bends in response to step (d).

7. The process of claim 1, wherein: the first mold portion has an internal wall that defines, at least in part, the first subspace, and step (d) includes applying force to the actuator portion with the internal wall during movement of the second mold portion in relation to the first mold portion.

8. The process of claim 1, wherein the material includes a polymer.

9. The process of claim 1, wherein: the latch member has a top end and a bottom end, the hinge is connected to the latch member at a connection location, the actuator portion extends from the connection location to the top end, the follower portion extends from the connection location to the bottom end, the follower portion of the latch member includes (i) a first follower segment extending from the connection location, and (ii) a second follower segment extending from the first follower segment, and the second follower segment includes the blocking structure.

10. The process of claim 9, wherein: the first follower segment, when viewed in cross section, defines a first linear outer surface segment, the second follower segment, when viewed in cross section, defines a second linear outer surface segment, the actuator portion, when viewed in cross section, defines a third linear outer surface segment, and the first linear outer surface segment and the third linear outer surface segment are arranged to define an acute angle.

11. The process of claim 10, wherein: $70° <$ the acute angle $< 90°$.

12. The process of claim 10, wherein: the first linear outer surface segment and the second linear outer surface segment are arranged to define an obtuse angle.

13. The process of claim 12, wherein: $70° <$ the acute angle $< 90°$, and $90° <$ the obtuse angle $< 110°$.

14. A process of making a closure having (i) a top portion, and (ii) a latch member that includes an actuator portion and a follower portion, the follower portion including a blocking structure, comprising:

(a) providing a mold assembly that defines a space therein which corresponds to the closure, the mold assembly including (i) a first mold portion that defines a first subspace which corresponds to the actuator portion, and (ii) a second mold portion that defines a second subspace which corresponds to the blocking structure;

(b) advancing a material into the space so as to form the closure;

(c) moving the second mold portion in relation to the first mold portion after step (b) so as to remove the actuator portion from the first subspace;

(d) urging an internal wall of the first mold portion into contact with the actuator portion in response to movement of the second mold portion in relation to the first mold portion so as to cause the actuator portion to move in relation to the top portion; and (e) moving the follower portion in relation to the second mold portion in response step (d) so as to cause the blocking structure to move away from of the second subspace.

15. The process of claim 14, wherein the mold assembly further includes a third mold portion, further comprising:

(f) advancing the third mold portion into contact with the follower portion while at least a part of the blocking structure is located outside of the second subspace.

16. The process of claim 15, wherein step (f) includes moving the third mold portion in relation to the second mold portion.

17. The process of claim 14, wherein step (c) further includes the step of moving the third mold portion in relation to the first mold portion.

18. The process of claim 14, wherein: the closure further has a hinge that is connected to both the latch member and the top portion, and the hinge bends in response to step (c).

19. The process of claim 14, wherein the material includes a polymer.

20. The process of claim 14, wherein: the latch member has a top end and a bottom end, the hinge is connected to the latch member at a connection location, the actuator portion extends from the connection location to the top end, the follower portion extends from the connection location to the bottom end, the follower portion of the latch member includes (i) a first follower segment extending from the connection location, and (ii) a second follower segment extending from the first follower segment, and the second follower segment includes the blocking structure.

21. The process of claim 20, wherein: the first follower segment, when viewed in cross section, defines a first linear outer surface segment, the second follower segment, when viewed in cross section, defines a second linear outer surface segment, the actuator portion, when viewed in cross section, defines a third linear outer surface segment, and the first linear outer surface segment and the third linear outer surface segment are arranged to define an acute angle.

22. The process of claim 21, wherein: $70° <$ the acute angle $< 90°$.

23. The process of claim 21, wherein: the first linear outer surface segment and the second linear outer surface segment are arranged to define an obtuse angle.

24. The process of claim 23, wherein: $70° <$ the acute angle $< 90°$, and $90 <$ the obtuse angle $< 110°$.

* * * * *